May 8, 1923.
P. RISSMAN
ANCHOR CONNECTION FOR FLEXIBLE CORDS
Filed April 29, 1922
1,454,253
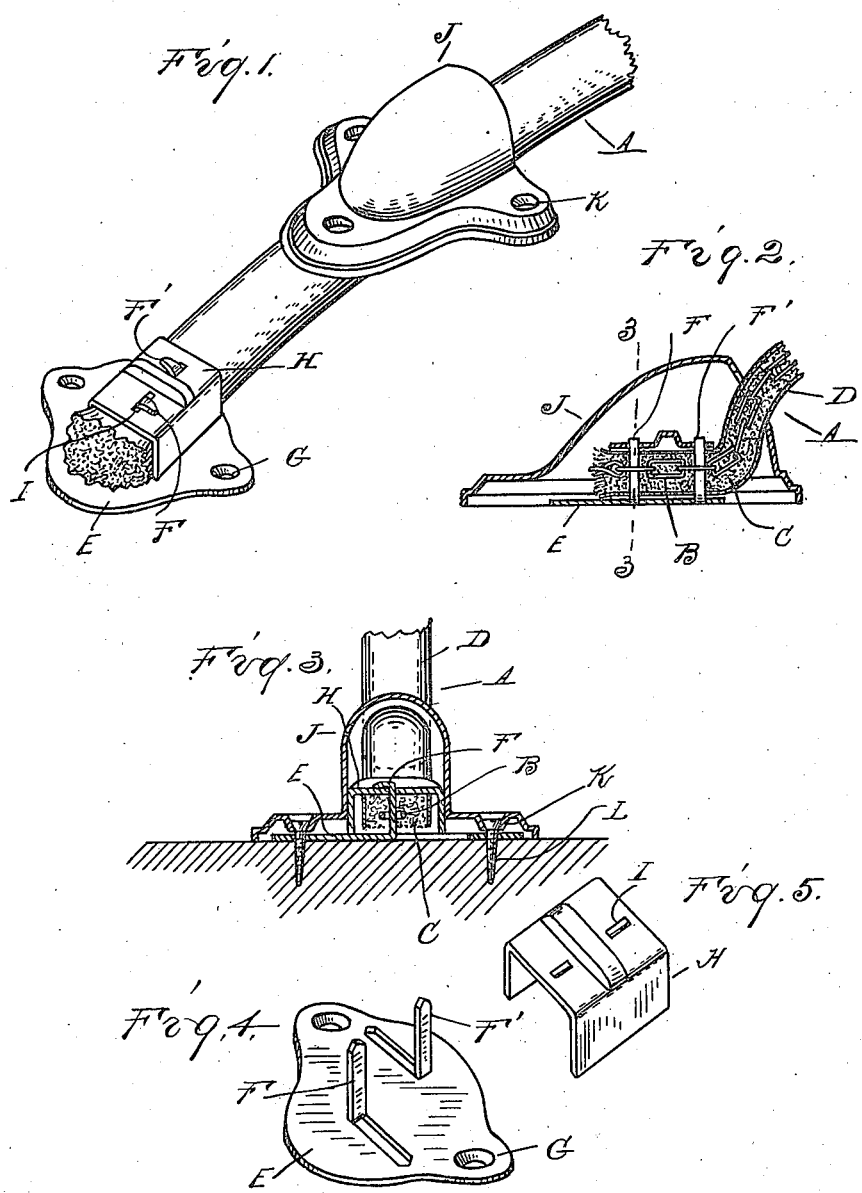
Inventor
Paul Rissman
By Whittemore Hulbert Whittemore
+Belknap  Attorneys Patented May 8, 1923.

1,454,253

UNITED STATES PATENT OFFICE.

PAUL RISSMAN, OF DETROIT, MICHIGAN, ASSIGNOR TO DETROIT INSULATED WIRE COMPANY, OF DETROIT, MICHIGAN, A CORPORATION OF MICHIGAN.

ANCHOR CONNECTION FOR FLEXIBLE CORDS.

Application filed April 29, 1922. Serial No. 557,296.

*To all whom it may concern:*

Be it known that I, PAUL RISSMAN, a citizen of the United States of America, residing at Detroit, in the county of Wayne and State of Michigan, have invented certain new and useful Improvements in Anchor Connections for Flexible Cords, of which the following is a specification, reference being had therein to the accompanying drawings.

The invention relates to anchor connections for flexible cords such as are used in the manufacture of robe rails, handles and other devices, and the invention consists in the construction as hereinafter set forth.

In the present state of the art flexible cords have been used in the manufacture of robe rails, handles and similar devices and with certain constructions these cords have been provided with a non-stretchable core formed of a link chain or some equivalent device. To secure the ends of the cord, it is usual to employ a fastener or escutcheon of an ornamental nature and, to prevent the pulling out of the cord from this fastener, a collar or abutment must be secured to the end portion of the cord. With my improved construction I have provided an anchoring device for the end of the cord, which will take all of the mechanical stresses without transmitting the same to the ornamental escutcheon plate. This permits of making the latter of light gauge metal and also forms a connection which is much more secure. I have also devised a specific construction of anchor which will be securely locked to the non-stretchable core of the cord and will not be disengaged therefrom.

In the drawings:

Figure 1 is a perspective view showing a section of a flexible handle robe rail or similar device with the anchor connection attached thereto and also having the ornamental escutcheon shown as detached from the anchor;

Figure 2 is a longitudinal section showing the parts secured;

Figure 3 is a cross-section taken on line 3—3 of Figure 2;

Figures 4 and 5 are perspective views of the parts of the anchor detached.

A is the flexible cord which, as shown, is formed of a chain core B surrounded by a cushioning body C and an ornamental covering D. My improved anchor comprises a plate E having struck up therefrom the prongs F and F' and being also provided with the countersunk apertures G for engaging the securing screws. H is an inverted U-shaped member for embracing the end of the cord and which is secured to the plate E by the prongs F and F', these passing upward and through apertures I in the member H. In securing the anchor to the cord, the prongs F and F' are inserted through the cord and in engagement with the core thereof, preferably passing through one or more of the links of the chain B. The upper ends of the prongs are then passed through the apertures I and are clinched to securely clamp the member H to the plate D. Before attaching the anchor to the cord, the ornamental escutcheon J is slipped under the cord, as shown in Figure 1. This escutcheon is then drawn backward so as to embrace the fastener formed by the members H and E and in this position countersunk apertures K in this escutcheon register with the apertures D in the plate E. Thus the same securing screws L are used for securing the escutcheon and anchor plate, but the mechanical stresses which are transmitted from the cord to the anchor are not carried through the escutcheon. Consequently, the escutcheon may be made of light gauge metal and is used purely for ornament.

What I claim as my invention is:

1. An anchor for a flexible cord comprising a plate having prongs struck up therefrom adapted to pass through the flexible cord and to interlock with the core thereof, a clamping plate for embracing the cord above said plate slotted for the passage of said prongs, the latter being clinched to secure said plate, and an escutcheon for covering said clamping plate and base plate, and adapted to bear against said clamping plate to reinforce the same.

2. An anchor for a flexible cord comprising a base plate apertured for engagement of securing screws and provided with struck up prongs for passing through the end of the flexible cord, a clamping member embracing said cord above said plate apertured for the passage of said prongs therethrough, said prongs being clinched above said anchor member, and an escutcheon plate sleeved on said cord covering said clamping plate and base plate and provided with apertures in alignment with the apertures in said base plate for securing both members, with the same screw, said escutcheon reinforcing said clamping plate.

3. An anchor for a flexible cord comprising a base plate formed of sheet metal having apertured ears for engagement with securing screws and provided with struck up prongs for passing through the end of the cord, an inverted U-shaped clamping plate above said base plate, said clamping plate being apertured for the passage of said prongs therethrough and said prongs being clinched over said clamping plate, and an escutcheon formed of light gauge metal, said escutcheon being sleeved on said cord and covering said clamping plate and base plate, said escutcheon engaging said clamping plate and reinforcing the same, said escutcheon being also provided with apertured ears which register with the apertures in said base plate, and securing screws for both plates passing through the registering apertures.

4. An anchor for a flexible cord comprising a base plate having prongs struck up therefrom, an inverted U-shaped member embracing said cord and engaging said plate, said U-shaped member having openings therein, said prongs extending through said cord and the openings in said U-shaped member and being clinched upon the latter, an escutcheon plate embracing said U-shaped member and engaging said plate, said escutcheon plate reinforcing said U-shaped member, and a common means for securing said escutcheon plate and said plate.

In testimony whereof I affix my signature.

PAUL RISSMAN.